(12) United States Patent
Specht

(10) Patent No.: US 6,669,232 B2
(45) Date of Patent: Dec. 30, 2003

(54) DEVICE FOR INFLATING AN AIRBAG

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 17 days.

(21) Appl. No.: 10/058,751

(22) Filed: Jan. 30, 2002

(65) Prior Publication Data

US 2002/0130500 A1 Sep. 19, 2002

(30) Foreign Application Priority Data

Mar. 15, 2001 (DE) .................................... 201 04 433 U

(51) Int. Cl.[7] .............................................. B60R 21/26
(52) U.S. Cl. ........................................ 280/736; 280/737
(58) Field of Search ................................ 280/736, 737, 280/740, 741, 742

(56) References Cited

U.S. PATENT DOCUMENTS 4,289,327 A    9/1981  Okada ........................ 280/737
5,062,662 A  * 11/1991  Cameron ..................... 280/733
5,322,326 A  *  6/1994  Ohm .......................... 280/737
5,642,902 A  *  7/1997  France ....................... 280/737
6,217,064 B1    4/2001  Schwuchow et al. ....... 280/737
6,247,725 B1    6/2001  Moller ....................... 280/737
6,485,052 B2 * 11/2002  Specht ....................... 280/736

FOREIGN PATENT DOCUMENTS

DE           19738741           3/1999

* cited by examiner

Primary Examiner—Paul N. Dickson
Assistant Examiner—Faye M. Fleming
(74) Attorney, Agent, or Firm—Lonnie Drayer; Jarett Rieger

(57) ABSTRACT

A device for inflating an airbag has a compressed gas container in which an inflation gas is held in readiness under high pressure. An inflation tube projects into the airbag that is to be inflated. A gas release nozzle is connected at one end with the compressed gas container and at another end with the inflation tube. A gas tight sealing device is released for the introduction of the inflation gas into the inflation tube. A throttle device throttles the inflation gas flow into the inflation tube and is arranged in the flow direction of the inflation gas behind the sealing device in the gas release nozzle.

7 Claims, 6 Drawing Sheets

DEVICE FOR INFLATING AN AIRBAG

FIELD OF THE INVENTION

The present invention relates to a device for inflating an airbag.

Discussion of the Prior Art

DE 197 38 741 teaches a device for inflating an airbag which provides side crash protection in a motor vehicle. To this effect an elongated inflation tube is arranged in the airbag. Inflation gas is directed into the inside of the airbag via the inflation tube.

It is known from the prior art, for example from U.S. Pat. No. 6,247,725, which is incorporated herein by reference, that a piston can be used to release gas from a storage vessel. FIG. 1 shows a prior art inflator taught in U.S. Pat. No. 6,247,725 that can be used for inflating an airbag with compressed gas from a vessel. A gas pressure container 100 includes an inflation head 104 that is contiguous to an outlet opening 103. The outlet opening is closed by a sealing element 115 that can be metal foil. The sealing element 115 is attached to a supporting disc 118 that is located in the outlet opening 103. The supporting disc 118 is in turn supported by a centrally arranged locking element 121 at an abutment 122 against the opening forces exerted upon said sealing element 115 by the gas pressure inside the container 100. An opening device is fitted with a triggering mechanism 130 which, when actuated, displaces locking element 121 and the sealing element 115, thereby opening the container outlet 103 and inflating an airbag. The locking element 121 can be moved out of the locking position by a laterally acting force that is produced by a piston 131 of the triggering mechanism 130, to open the gas outlet opening 103. It is suggested that to ensure that the pressure container will open and that an appropriate amount of gas will be released, a throttling member 149 be provided in the gas pressure container 100 in the direction of gas exhaust upstream from the outlet opening 103, with a pressure chamber 146 between said throttling 149 and the outlet opening 103 in the bottleneck. In the known device, the load on the supporting disc 118 produced by the compressed gas is conveyed via the centrally located locking element 121 into the abutment 122 that is rigid with the vessel containing compressed gas. For this purpose, it is necessary that the device components have exact dimensions in order to avoid deviations from the force transmission in the longitudinal axis of the locking element.

SUMMARY OF THE INVENTION

There is provided in accordance with the present invention a device for inflating an airbag comprising a gas container in which an inflation gas is held in readiness under high pressure, an inflation tube that extends into the airbag, a gas release nozzle that is connected a gas tight manner at its one end to the gas container and a gas tight manner at its other end to the inflation tube, a gas tight sealing device which during normal operation outwardly seals the compressed gas container and which is opened to allow gas to enter the inflation tube, and a throttle device which throttles the inflation gas flow into the inflation tube and which is located in the flow direction of the inflation gas behind the sealing device in the gas release nozzle.

DETAILED DESCRIPTION OF THE INVENTION

Figure 3:
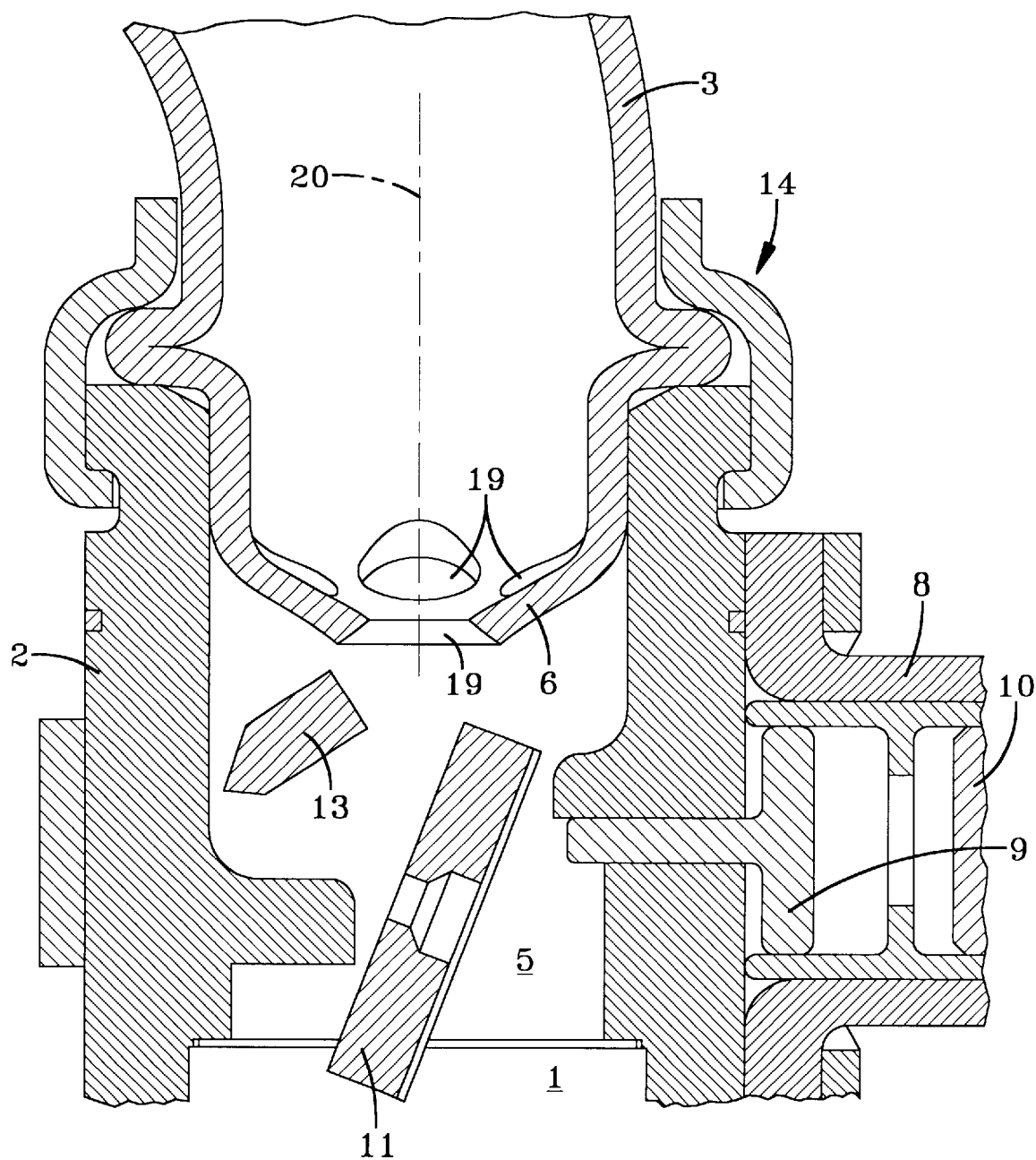
FIG. 3 shows the embodiment of FIG. 2 during the removal of the sealing device from the opening.
Figure 4:
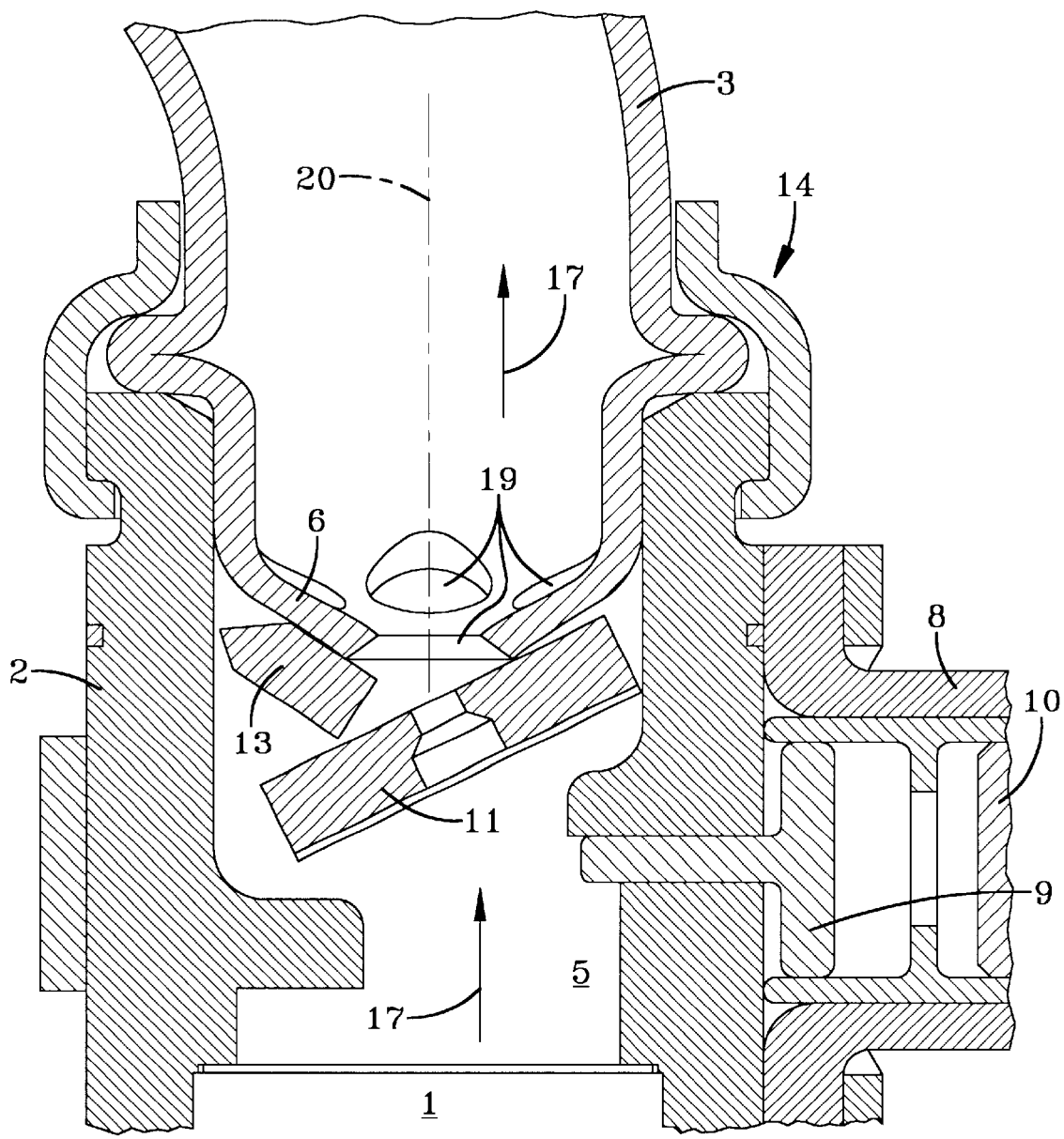
FIG. 4 shows the embodiment of FIG. 2 during the flow of the inflation gas into the inflation tube with retained part of the sealing device.
Figure 6:
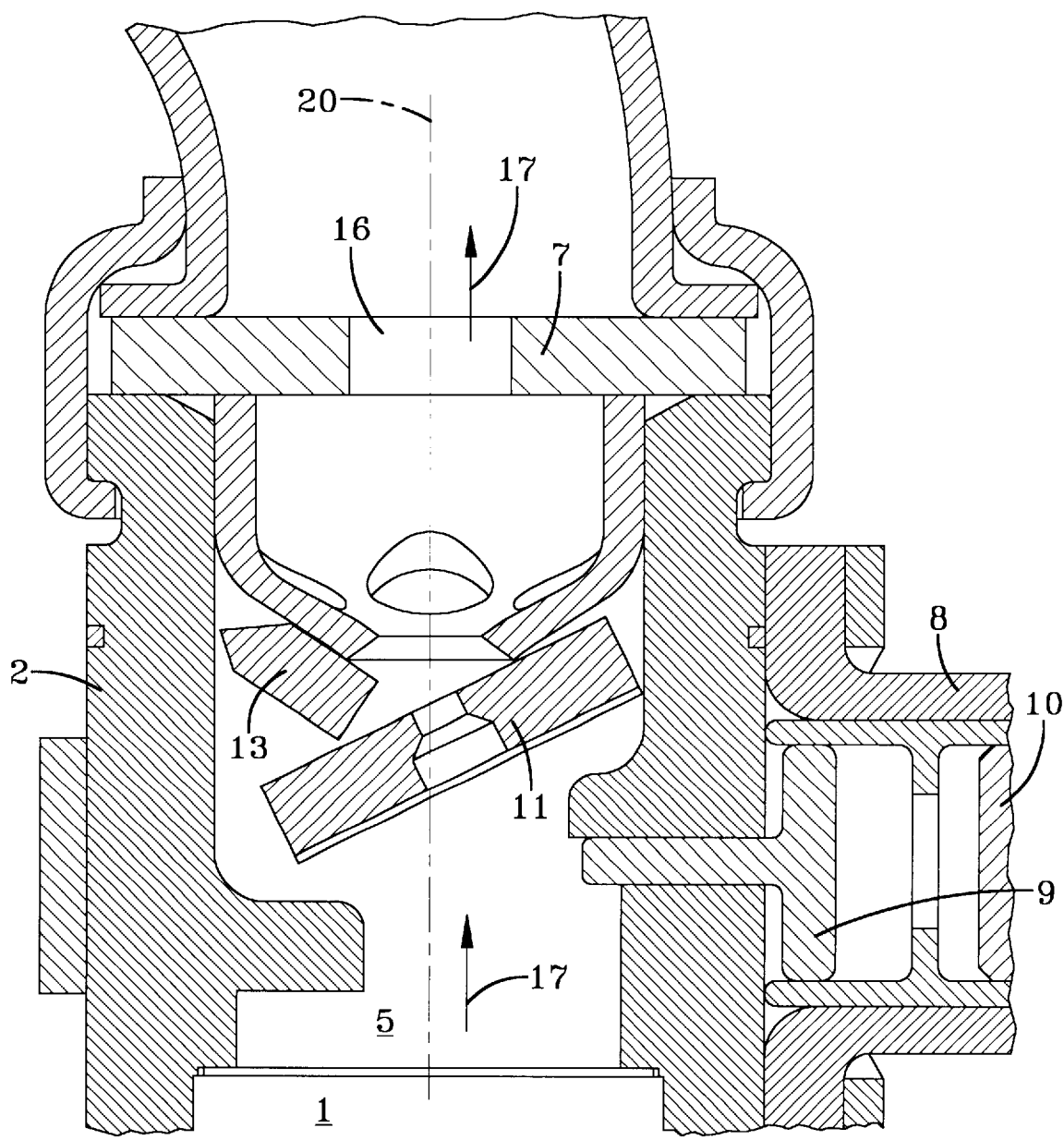
FIG. 6 shows the embodiment of FIG. 5 with the released sealing device and the introduction of the compressed gas into the inflation tube.

The embodiments of a device for inflating an airbag according to the present invention shown in the drawings comprise a gas release nozzle 2 which at its one axial end, the lower end in the drawing, is connected to a compressed gas container 1 and at its other axial end, the upper end in the drawings, with an inflation tube 3, in each case in a gas tight manner, as is known for instance from DE 197 38 741. The compressed gas container 1, which is not represented in detail in the drawing, can be formed as one piece with the gas release nozzle 2. It is also possible, however, that the compressed gas container 1 is connected to the gas release nozzle 2 via a gas tight weld seam. In the compressed gas container an inflation gas, in particular an inert gas, for instance helium, argon or a mixture thereof, is held in readiness under high pressure. The inflation tube 3 is connected via a tube connection 14 with the upper axial end of the gas release nozzle 2 in a gas tight manner. This can be achieved by means of a weld seam between the inflation tube 3 and the upper end of the gas release nozzle 2 and/or a connection shell surrounding both components. In the gas release nozzle 2 a sealing device 4 is foreseen. The latter consists of a sealing plate 11, which comprises a sealing foil 12 on its side turned towards the inside of the compressed gas container 1. This way an opening 5, shown in FIGS. 3, 4 and 6, is closed in a pressure-sealed and gas tight manner. This sealing device 4 can be provided in the release nozzle 2 or at the upper end of the compressed gas container 1.

Figure 1:
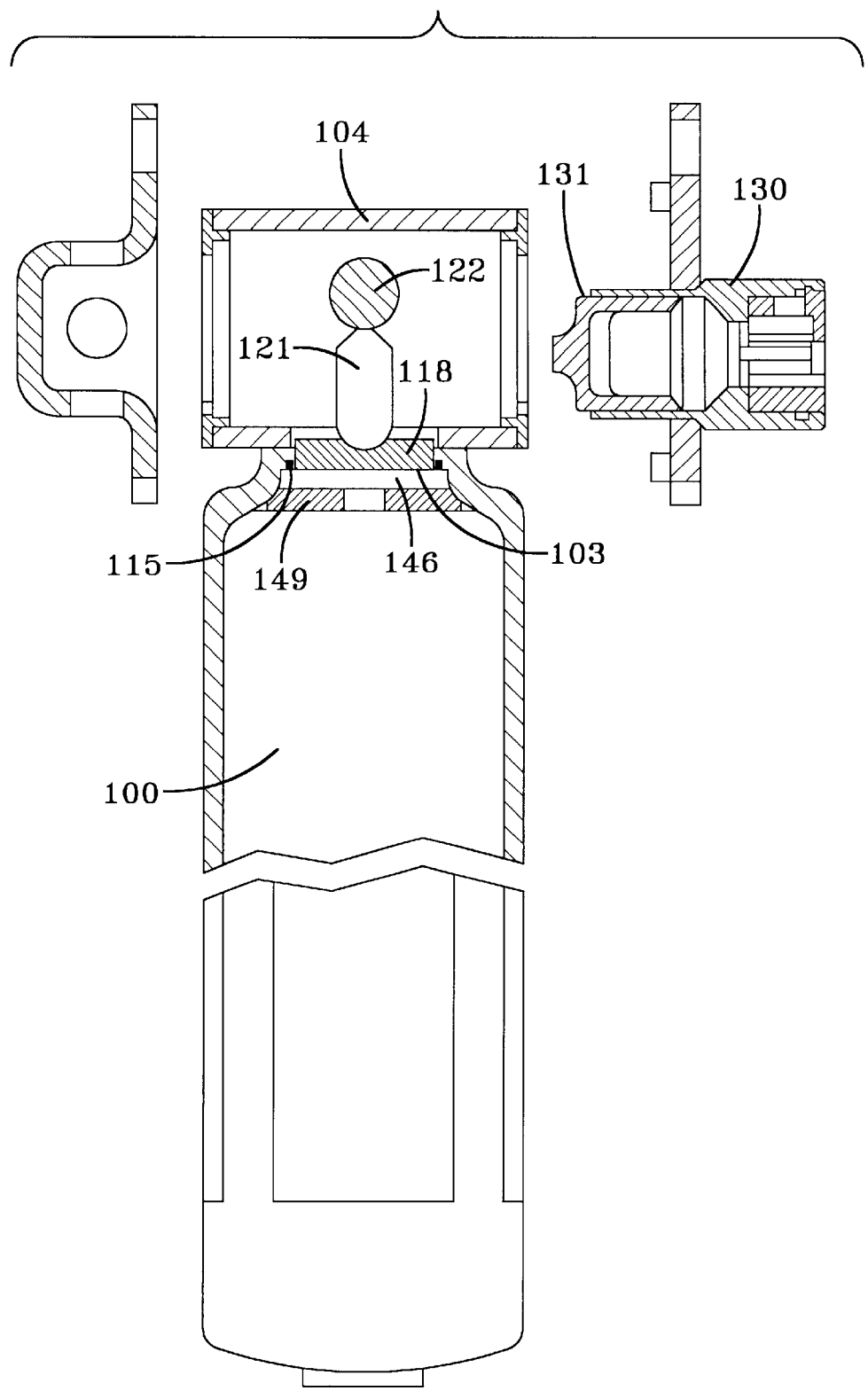
FIG. 1 is a prior art airbag inflator.
Figure 2:
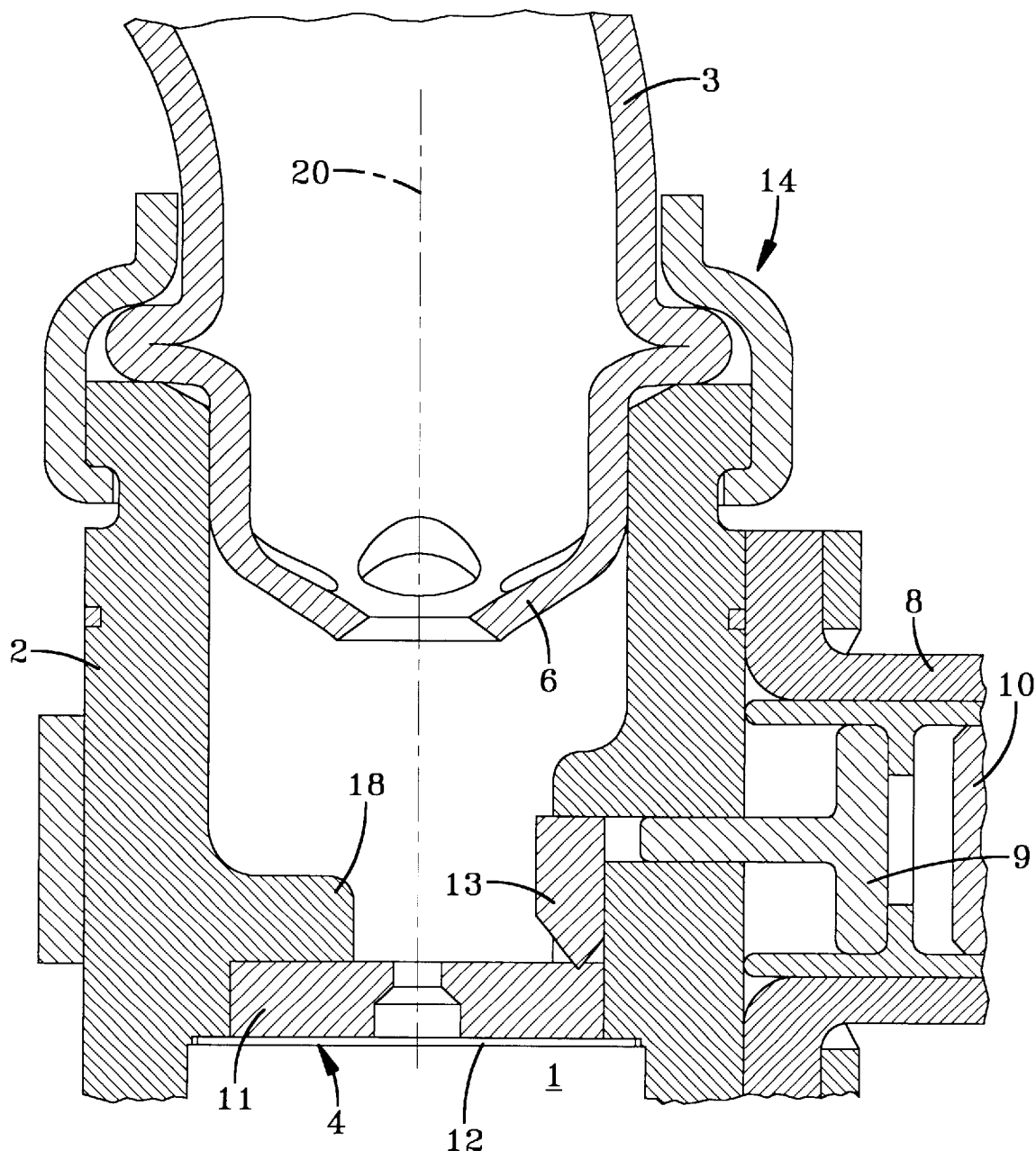
FIG. 2 is a sectional view of a first embodiment of a device for inflating an airbag according to the present invention during normal operation.
Figure 5:
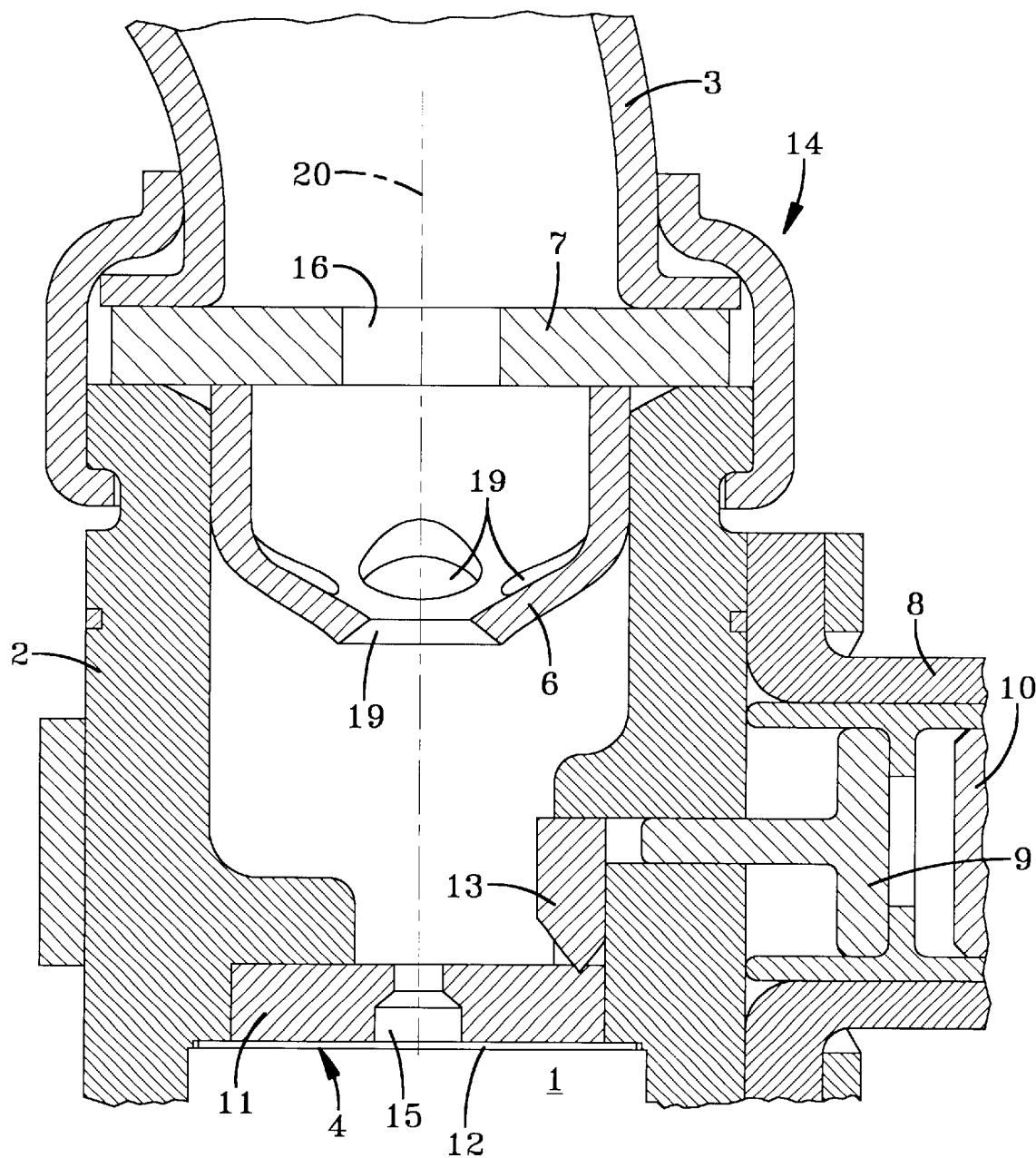
FIG. 5 shows a further embodiment of a device for inflating an airbag according to the present invention during normal operation.

The sealing device 4 is held in its locking position at an inwardly projecting housing projection 18 and a support 13 in the normal operating position shown in FIGS. 2 and 5. The housing projection 18 and the support 13 form an abutment against the high pressure present in the compressed gas container 1 of the inflation gas, which can for instance measure approximately 600 bar.

FIG. 3 shows that to release the opening 5, the support 13 is removed from the support position shown in FIGS. 2 and 5. This occurs by means of a release piston 9 which, in a radial direction to the axis 20 of the gas release nozzle, is moved with the help of an e.g. electrically ignited propellant 10 towards the support 13 and the latter is removed from its support position, as shown in FIGS. 2 and 5, in which the opening 5 is closed by the sealing device 4. During the removal of the support 13 from its support position, the sealing plate 11 is pivoted or tilted around the inwardly projecting housing projection 18 due to the high pressure in the compressed gas container 1, as is shown in FIG. 3. The opening 5 is released and the inflation gas, for instance helium or argon or a mixture thereof, flows in the gas emission direction 17 out of the compressed gas container 1 in an axial direction into the tube end of the inflation tube 3, as shown in FIGS. 4 and 6.

In the flow path of the inflation gas, behind the opening 5, a throttle device comprising one or several throttle openings narrowing the cross section of the flow, is provided. In the embodiment shown in FIG. 5, a separate throttle device is provided in the shape of a throttle plate 7. The latter is securely fastened to the axial end of the gas release nozzle 2 by means of the tube connection 14.

In the embodiment shown in FIGS. 2 to 4, a catch piece 6 which, as shown in FIG. 4 catches detached parts, such as the support 13 and sealing plate 11, during the opening of the sealing device 4, acts as a throttle device. The catch piece 6 comprises one or several openings 19, which narrow the cross section of the flow of the inflation gas escaping from the compressed gas container 1 on its flow path into the inflation tube 3. This way the flow speed of the inflation gas into the inflation tube 3 is reduced, so that only reduced forces act upon the inflation tube 3 and in particular the connection 14 between the inflation tube 3 and the gas release nozzle 2. The catch piece holds back gas generator parts that detach during the release of the sealing device. These parts are hereby prevented from getting into the inflation tube. It is also possible to arrange a separate throttle device, preferably in the shape of a throttle disc, in the gas release nozzle, in particular behind the catch piece.

In the embodiment shown in FIGS. 5 and 6, a catch piece 6 is likewise foreseen. In this embodiment, in addition to the catch piece function, two successive throttle effects on the escaping inflation gas are achieved. The first throttle effect is ensured by the catch piece 6 and the second throttle effect is ensured by the throttle plate 7 with the at least one throttle opening 16.

During normal operation of the vehicle in which the airbag is installed, the opening 5 is closed by the sealing device 4 in a pressure-sealed and gas tight manner. In this state, the throttle device is located in the flow direction 17 of the inflation gas behind the sealing device 4. This positioning is shown in FIGS. 2 and 5 above the sealing device 4. In the embodiments of FIGS. 2, 3 and 4, the throttle device consists of the catch piece 6, as already mentioned. In the embodiment of FIGS. 5 and 6, in addition to the catch piece 6, a separate or further throttle device is provided in the shape of a throttle plate 7 with the at least one throttle opening 16 contained therein. The throttle device is thus positioned behind the sealing device 4 or opening 5 and in front of the tube end of the inflation tube 3 in the gas emission direction 17. This way a pre-adjustable gas amount flow, introduced into the inflation tube 3 for the inflation of the airbag per unit of time, is achieved.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

I claim:

1. An inflator for inflating an airbag comprising
   a gas container in which an inflation gas is held in readiness under high pressure,
   an inflation tube that extends into the airbag, a gas release nozzle that is connected in a gas tight manner at one end to the gas container and in a gas tight manner at another end to the inflation tube,
   a gas tight sealing device comprising a sealing plate which during normal operation is retained in a sealing relationship with the gas container by a support to seal the compressed gas container, the support directly contacts the sealing plate,
   a throttle device spaced apart from the sealing plate during normal operation which throttles the inflation gas flow into the inflation tube and is located in the flow direction of the inflation gas behind the sealing plate in the gas release nozzle,
   a catch piece that retains the sealing plate and support that are displaced to release gas from the gas container, and
   a housing projection cooperating with the support for retaining the sealing plate in a sealing relationship with the gas container, the housing projection abuts approximately one third of an outer surface of the sealing plate facing the throttle device, wherein when the support is displaced the sealing plate pivots around the housing projection allowing gas to enter the inflation tube.

2. The inflator for inflating an airbag according to claim 1 wherein the throttle device comprises the catch piece.

3. The inflator for inflating an airbag according to claim 1 wherein the gas emission direction runs from the compressed gas container to the inflation tube in an axial direction of the gas release nozzle.

4. The inflator for inflating an airbag according to claim 1 further comprising a piston for displacing the support, the piston has a center portion extending in the direction of the support whereby the movement of the piston in a radial direction to an axis of the gas release nozzle results in the center portion of the piston displacing the support.

5. The inflator for inflating an airbag according to claim 2 wherein the gas emission direction runs from the compressed gas container to the inflation tube in an axial direction of the gas release nozzle.

6. The inflator for inflating an airbag according to claim 2 wherein the catch piece comprises at least one opening, the catch piece narrows a cross section of the flow of inflation gas escaping the gas container on its flow path into the inflation tube.

7. The inflator for inflating an airbag according to claim 2 wherein the throttle device further comprises a throttle plate disposed between the catch piece and the inflation tube.

* * * * *